Nov. 11, 1924.  1,514,974
C. W. LADD
SHOVEL
Filed April 12, 1921
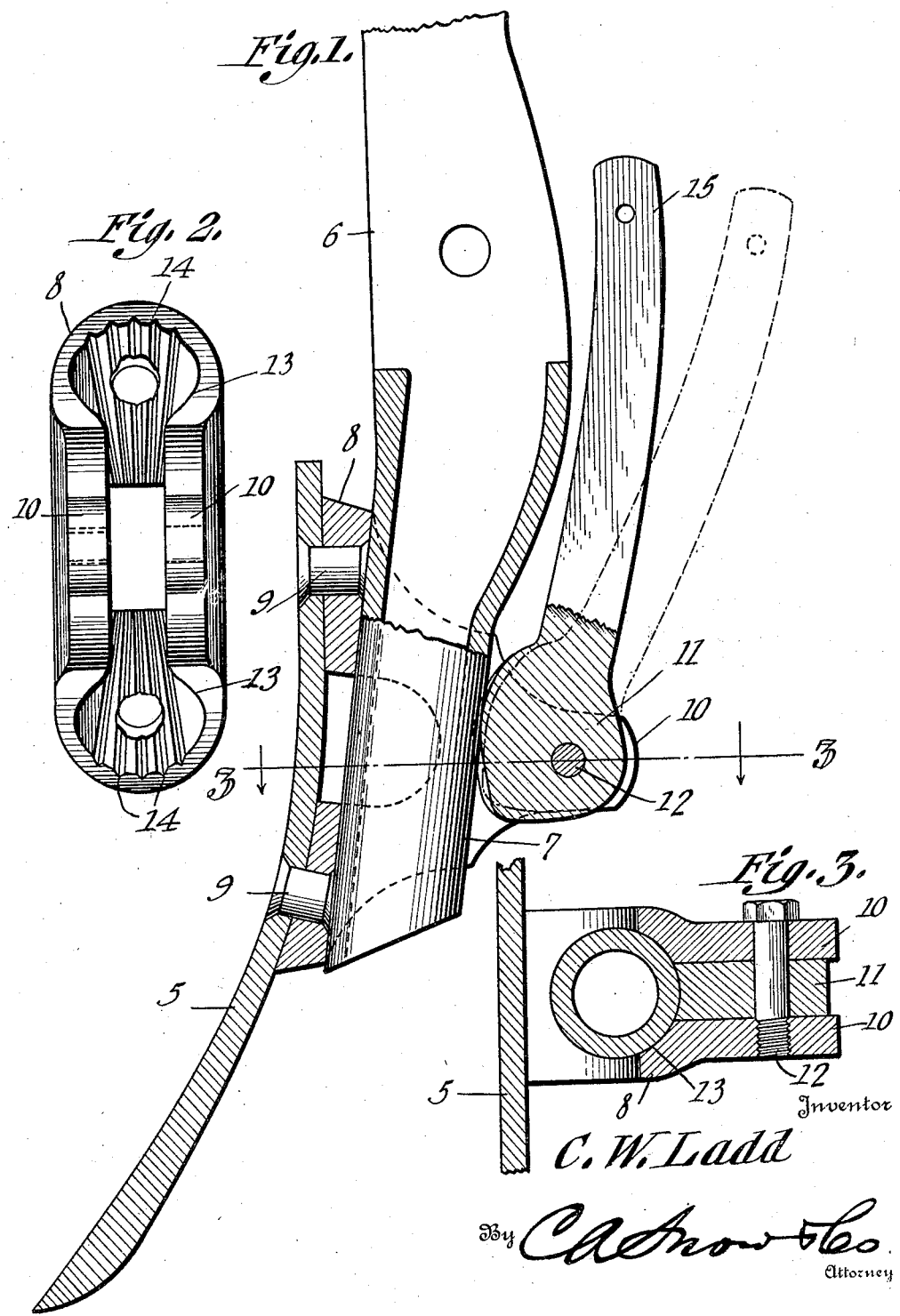
Inventor
C. W. Ladd
By CA Snow & Co.
Attorney Patented Nov. 11, 1924.

1,514,974

UNITED STATES PATENT OFFICE.

CLAYTON W. LADD, OF DUBUQUE, IOWA.

SHOVEL.

Application filed April 12, 1921. Serial No. 460,737.

*To all whom it may concern:*

Be it known that I, CLAYTON W. LADD, a citizen of the United States, residing at Dubuque, in the county of Dubuque and State of Iowa, have invented a new and useful Shovel, of which the following is a specification.

This invention relates to plows and harrows, and more particularly to the means for attaching the blades or shovels thereof, to their supports.

The primary object of the invention is to provide a quick acting device for securing the plow or harrow blade to its support, the device being controlled by an eccentric, whereby the plow or harrow blade support may be gripped eliminating the use of the usual bolts employed for securing the blades.

A further object of the invention is the provision of means for preventing lateral or twisting movement of the blades, with respect to their support.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a vertical sectional view through a blade and its support.

Figure 2 illustrates a rear elevational view looking into the securing collar.

Figure 3 illustrates a sectional view taken on line 3—3 of Figure 1.

Referring to the drawing in detail, the invention is shown as applied to a shovel plow, the shovel being indicated by the reference character 5, the support for the shovel being indicated at 6.

As shown, the support 6 is provided with a shank 7 formed at the lower end thereof, the shank being preferably circular in cross section, as indicated by Figure 3 of the drawing.

Secured to the rear of the shovel 5 is a securing collar or sleeve 8 which is provided with suitable openings to accommodate rivets 9 that pass through the collar 8 and through suitable openings in the shovel, whereby the collar is secured to the shovel.

The sleeve 8 is provided with a cut out portion, there being ears 10 formed integral with the collar to accommodate the eccentric 11, which is pivoted between the ears as by means of the pivot pin 12. This eccentric is provided with an operating handle 15 by means of which the eccentric may be moved into and out of contact with the shank 7 of the support.

From the foregoing it will be seen that when the handle 15 is moved to a position as indicated by Figure 1 of the drawing, the eccentric will be moved into binding relation with the shank 7, which movement draws the inner wall 13 of the collar 8 into close engagement with the shank 7.

In order that the collar will be prevented from twisting with respect to the shank 7, a plurality of grooves 14 are formed on the inner wall thereof, which grooves provide a roughened surface to contact with the shank, the roughened surface when in operation, biting into the shank to prevent twisting or rotary movement, of the shovel.

In the use of the device, if it is desired to remove the shovel secured by a mechanism as described, it is only necessary to move the operating handle 15 from a position as indicated in full lines, to a position as indicated in dotted lines in Figure 1 of the drawing, whereupon the eccentric is moved out of engagement with the shank 7 and the shovel may now be readily removed.

It is obvious that if a shovel is to be applied, the same is slid over the shank portion of the support, and the eccentric moved to a position as indicated in full lines in Figure 1 of the drawing.

Having thus described the invention, what is claimed as new is:—

A shovel attaching means including a split collar, having grooves formed therein, said grooves providing a roughened inner surface, said split collar adapted to be secured to a shovel plow, a pivot pin connecting the side walls of the split collar, a lever mounted on the pivot pin and having an eccentric formed at one end thereof, said eccentric adapted to engage the shovel plow supporting standard to draw the roughened surface of the sleeve into engagement with the standard to hold the shovel plow against movement.

In testimony that I claim the foregoing as my own, I have hereto affixed my signature in the presence of two witnesses.

CLAYTON W. LADD.

Witnesses:
  MARY DONDELINGER,
  ROSE KULA.